J. D. MILLER.
ANIMAL TRAP.
APPLICATION FILED JUNE 27, 1919.

1,327,490.

Patented Jan. 6, 1920.

WITNESSES
H. C. Hebig
J. L. McAuliff

INVENTOR
JOHN DAVID MILLER
BY
ATTORNEYS

UNITED STATES PATENT OFFICE.

JOHN DAVID MILLER, OF SAN DIEGO, CALIFORNIA.

ANIMAL-TRAP.

1,327,490.  Specification of Letters Patent.  Patented Jan. 6, 1920.

Application filed June 27, 1919. Serial No. 307,135.

*To all whom it may concern:*

Be it known that I, JOHN DAVID MILLER, a citizen of the United States, and a resident of San Diego, in the county of San Diego and State of California, have invented a new and Improved Animal-Trap, of which the following is a description.

My invention relates to animal traps and more particularly to a trap of the type having a trap compartment and a holding compartment leading therefrom to which the animal may find access, together with self-setting means.

The object of the invention is to provide a trap of the indicated type improved in various particulars, with respect to trapping and setting devices, and the provision of means to detach the holding compartment from the trapping compartment for convenience in disposing of the trapped animal or animals.

Reference is to be had to the accompanying drawings forming a part of this specification, it being understood that the drawings are merely illustrative of one example of the invention.

Fig. 3 is a detail in transverse vertical section, the view being taken at the registering openings provided in the adjacent sides of the trapping and holding compartments for the entrance of the animal to the latter compartment and showing details to be hereinafter referred to.

Figure 1:
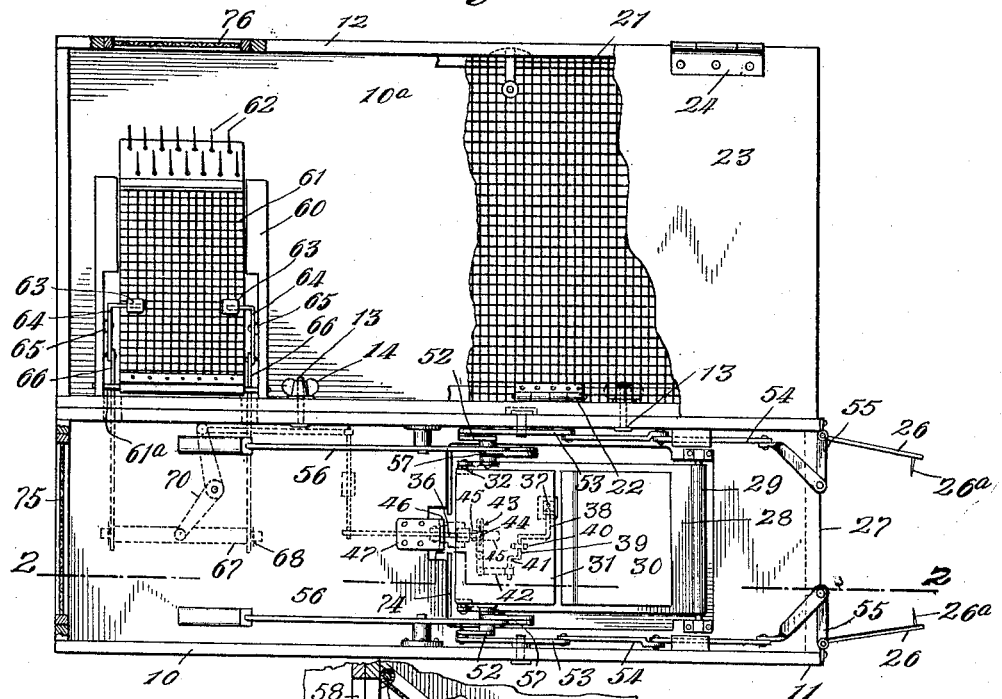
Figure 1 is a plan view, the top of the trapping compartment being removed and parts of the covers of the holding compartment being broken away and certain parts being shown in section.
Figure 2:
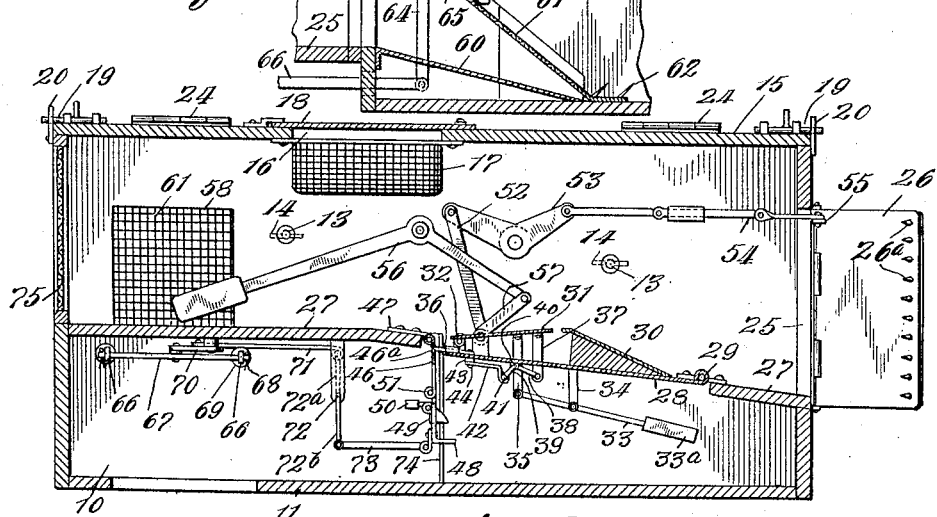
Fig. 2 is a longitudinal vertical section on the line 2—2, Fig. 1.

The numeral 10 indicates the trapping compartment and $10^a$ the holding compartment, these being formed by separate structures 11, 12, detachably united by bolts 13 passing through the adjacent sides of the structures and provided with nuts 14. In the top 15 of the compartment 10 an opening 16 is provided, beneath which is the bait box 17, there being a suitable cover 18 for said opening. The top 15 is detachably secured in any suitable manner as by bolts 19 thereon engaging suitable catches 20 on the box 11. The box structure 12 has preferably two covers, there being a cover 21 of wire mesh hinged along one edge as at 22 and an imperforate cover 23 above the first cover and hinged as at 24 preferably at the opposite side from the hinges 22. The trap compartment 10 has an entrance opening 25 at an end closed by a pair of swing doors 26 having spurs $26^a$ adjacent to their meeting edges. The floor 27 through which the opening 25 leads has a cut-out portion in which is a platform 28 hinged at its front edge as at 29, the platform advantageously having a ramp 30 leading to a depressible leaf 31 hinged at its rear edge as at 32, the depression of which by the animal serves to release the platform 28 and permit it to drop. The leaf 31 is counterbalanced by a weight $33^a$ on a lever 33 fulcrumed between its ends on a depending bracket 34 or the like on the drop platform 28, the arm of the lever opposite the weight being suitably connected as by a hanger 35 with the leaf 31. The illustrated connection between the leaf 31 and bolt 36 is as follows: A depending bracket 37 on said leaf forms a bearing for a crank arm 38 on a rock shaft 39 turning in a bearing 40 on the platform 28, the opposite end of the shaft having a second crank arm 41 connecting by a link 42 with a lever 43 fulcrumed on the platform 28, the opposite arm of the lever having a suitable connection 44 extending through a slot 45 in the platform 28 and connecting with the bolt 36. Upon withdrawal of the latch bolt 36 the platform 28 may drop to a stop ledge 48 on a depending leaf 46 hinged at its upper end to the floor 27. The bolt passes beneath a catch 49 rockably mounted on the leaf 46 and provided with a counter-weight 50 to prevent the bolt and platform from rising until the bolt is released by the animal as hereinafter explained. The lower portion of the leaf 46 carrying the stop 48 and catch 49 is hinged to the upper portion as indicated at 51.

Suitable connection is established between the platform 28 and the doors 26 to close the latter by the depression of the platform, there being shown links 52 pivoted on the platform and rising therefrom, the upper ends being pivoted to bellcranks 53 on the sides of the structure 11, the bellcranks being in turn connected by a suitable link system 54 with lever arms 55 rigid with the doors 26. The raising of the platform 28 is brought about by a weighted lever arm 56 connected with said platform as by a link 57. The depression of the platform closes the doors and the rising of the platform opens the doors leaving the trap again set.

The animal can find escape from the trap compartment to the holding compartment 10ª through registering openings 58, 59 in the adjacent sides as best seen in Fig. 3. In the box 12 adjacent to the opening 59 is a ramp 60 down which the animal passes. Over the ramp is an inclined guard 61 of wire or other open material, through which the animal can see. Said guard is rockably mounted at its upper end as at 61ª adjacent to the top of the opening 59 and ranges obliquely beyond the front end of the ramp 60 that is provided with spurs 62 to prevent the animal lifting the guard in the attempt to return to the trap compartment. The raising of the guard 61 by the animal in passing to the holding compartment serves to release the latch 36 for resetting the trap, for which purpose the lever 64 has a down-turned upper end fulcrumed as at 65 and presenting an arm having weights 63 bearing against the top surface of the guard 61. The weight and lever tend to maintain the guard 61 in position but the weight will be raised and the lever rocked by the animal forcing his way into the holding compartment 10ª. Said lever 64 is secured to links 66 that extend into compartment 10 and are united by a cross bar 67 which is detachably held to the links by cotter pins 68 or the like, and said bar is pivoted to one arm of a lever 70, the opposite arm of which connects by a link 71 with an upwardly extending crank arm 72ª on a rock shaft 72, the lower arm 72ᵇ of which shaft connects by a link 73 with the lower end of the hinged leaf 46 so that a rocking of the lever 64 by the animal will serve to draw the hinge leaf 46 rearwardly, withdrawing the catch 49 from above the bolt 36, thereby releasing the bolt and the platform 28 and permitting the latter to rise under the action of the weighted lever 56. In the raised position of the platform 28 the bolt 36 is again engaged by the hinged leaf 46 which is provided with a bolt-receiving opening 46ª for the purpose. By removing the cotter pins 68 and detaching the links 66 from the coupling bar 67 and the nuts 14 having been unscrewed from the bolts 13, the structure 12 can be detached from the structure 11, the said links passing through registering holes 69 in the adjacent walls of the structures. A transverse partition 74 at each side of the hinge leaf 46 prevents the animal from getting beneath the floor 27. The far end of the trap compartment is provided with a mesh covered window 75 to lead the animal to that end of the compartment adjacent to which are the openings 58, 59 and the animal is permitted to see into the holding compartment 10ª through the guard 61, there being a window provided with a wire mesh screen as indicated at 76 in the side of the structure 12 opposite the opening 59 and in line with the ramp and guard 60, 61.

It is to be noted that the trapping and resetting operations are carried out without the use of springs which are liable to get out of order.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. An animal trap comprising separable structures forming respectively a trapping compartment and a holding compartment, means detachably uniting the adjacent walls of said structures, registering openings in said walls for the passage of the animal to the holding compartment, a door affording entrance to the trap compartment, a drop platform in said trap compartment, means tending to raise said platform, connection between the platform and doors to close the doors by a dropping of the platform and open the doors by a raising of the platform, a latch bolt on the platform, means to engage said bolt in the raised and depressed positions of the platform, means on the platform and operable by the animal to release the bolt for the depression of the platform, and means operative by the animal in passing into the holding compartment to release the bolt engaging means for permitting the platform to rise for the resetting of the trap, said last-mentioned means including links extending from the holding compartment through adjacent walls of the two structures to the trap compartment and detachable connections between said links and the bolt-engaging means, the disconnection of said links permitting the same to be removed with the holding compartment.

2. An animal trap including a trap compartment and a holding compartment in communication for the passage of the animal, a door through which the animal may find entrance to the trapping compartment, a floor to which said opening leads, said floor having an opening therein, a depressible platform at said opening and hinged at its front end, a bolt at the opposite end of the platform, a hinge leaf on said platform adapted to be depressed relatively to the platform and connected with said bolt to withdraw the bolt from a latching position, a counter-balance lever fulcrumed beneath the platform and connected with said leaf tending to raise the same, a depending bolt-engaging element hinged at its upper edge at the rear side of said opening and having means to engage said bolt, both in the raised and depressed positions of the platform, means operable by the animal in passing to the holding compartment to actuate said bolt engaging means and release the bolt to permit the platform to be raised, means normally tending to raise the platform, and connections between the door and the platform to close the door with the dropping of the platform and open the door with the raising of the platform.

JOHN DAVID MILLER.